J. BOWIE.
METALLIC PACKING.
APPLICATION FILED JAN. 14, 1911.
989,228.
Patented Apr. 11, 1911.
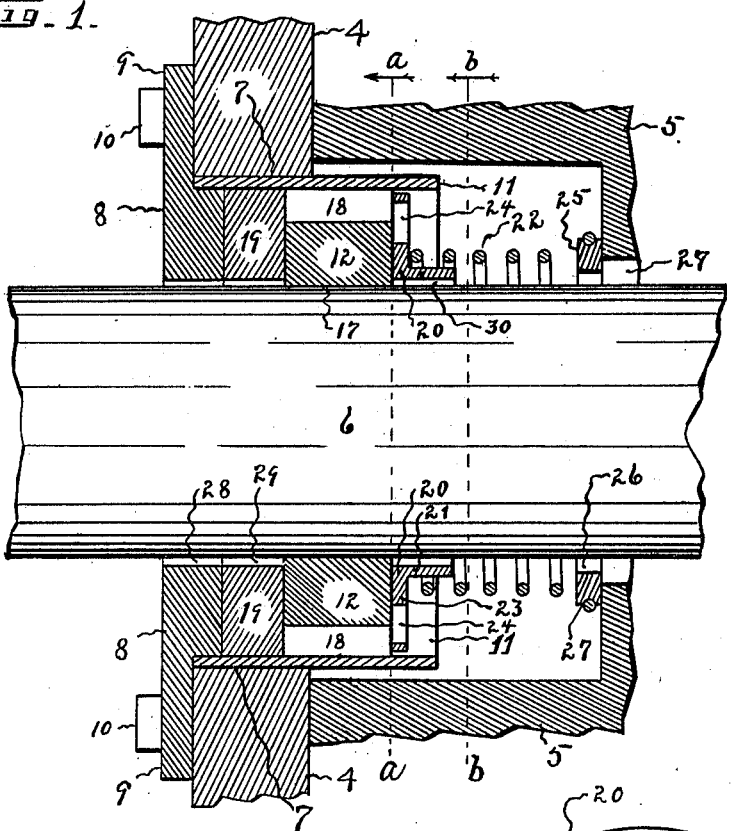
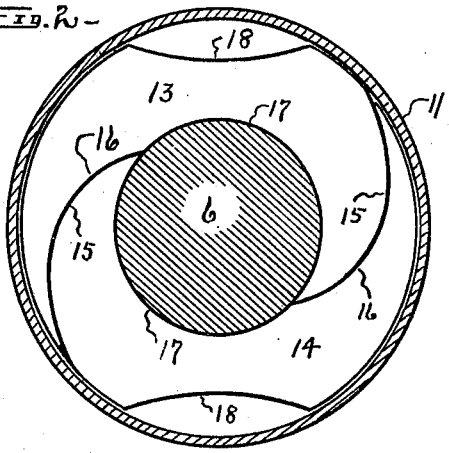
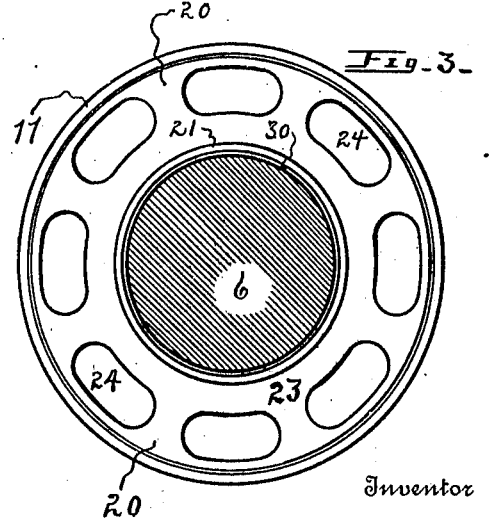
Witnesses
Lora L. Sturges.
Geo. Henderson.
Inventor
James Bowie,
By Hiram A. Sturges
Attorney

UNITED STATES PATENT OFFICE.

JAMES BOWIE, OF OMAHA, NEBRASKA.

METALLIC PACKING.

989,228. Specification of Letters Patent. Patented Apr. 11, 1911.

Application filed January 14, 1911. Serial No. 602,547.

*To all whom it may concern:*

Be it known that I, JAMES BOWIE, a citizen of the United States, residing at 1911 Binney street, Omaha, in the county of Douglas and State of Nebraska, have invented certain new and useful Improvements in Metallic Packing, of which the following is a specification.

This invention relates to improvements in metallic packing for steam engines generally, and more particularly for the piston rods of cylinders of locomotives, and has for its objects to provide a packing which will be reliable in use and will comprise few parts so that it will be durable and may be economically constructed, and may be conveniently mounted without removing the piston from the cylinder.

The invention includes the employment of a two-part packing ring, so formed with relation to each other that the pressure of steam forces them into contact with the rod, and when the pressure is removed, as when steam is cut off while moving down an incline, the parts of the packing ring may bear loosely upon the surface of the piston rod.

The invention consists of the novel construction, combination and arrangement of parts as described herein and claimed, and as illustrated in the drawing, it being understood that changes in form, size, proportion and minor details may be made within the scope of the claims without departing from the spirit of the invention or sacrificing any of its advantages.

In the accompanying drawing, Figure 1 is a view showing a part of a piston rod, the cylinder head and packing box being broken away and in section, the packing ring and parts connected therewith being in section. Fig. 2 is a transverse sectional view on line *a a* of Fig. 1, looking to the left, the packing box and cylinder head being omitted. Fig. 3 is a similar view on line *b b* of Fig. 1, showing the casing, follower and piston rod.

The construction provides for holding the parts of the packing ring in proper relation to each other, steam operating to press the two parts together and to press them upon the surface of the piston rod, an absence of steam pressure permitting the two parts of the packing ring to have a play. In the construction employed, substantially no wear from the piston comes upon any of the parts except the packing ring, and the rod may reciprocate without friction except so far as the necessary bearing of the packing ring upon the surface of the piston is required, to prevent escape of steam.

Referring now to the drawing for a more particular description, numeral 4 indicates the head of a cylinder, and disposed upon the inner side of the cylinder head is the packing box indicated at 5 and said packing box may be secured by any suitable means upon the cylinder head.

The piston rod is indicated at 6. An annular aperture 7 is provided in the cylinder head, of greater diameter than the piston rod; and between the wall of this aperture and the piston rod, and within the packing box, are mounted all of the parts of the packing, except the gland 8. Gland 8 is provided with a flange 9 adapted to have a mounting upon the outer wall of the cylinder head, and it may be secured thereto by bolts 10.

A cylindrical casing or sleeve is indicated at 11. Its outer end is disposed between the cylinder head and the body of gland 8, and it projects within the packing box.

At 12 is indicated a two-part, metallic packing ring, consisting of two segments 13 and 14 of uniform size and shape, each segment having curved contact-surfaces or walls 15 and 16 extending transversely from its inner wall 17 to its periphery, each segment being formed, upon its periphery, with a longitudinal recess or channel 18.

The segments, when assembled, are adapted to have seatings within casing 11 in contact with each other and in contact with the piston rod, their inner walls 17, each of a half circle, bearing upon said rod. When the segments are assembled within the casing, the recesses or channels 18 will be disposed opposite to each other, and the diameter of the segments or space occupied by them within the casing should be somewhat less than the interior diameter of the circular opening of the casing, to allow a free movement of the piston rod between walls 17, when steam is not under pressure.

Walls 15 of the segments are formed convexed, and walls 16 are concaved, the degree of curvature of these parts corresponding, so that said walls may bear upon each other.

At 19 is indicated a chafing ring disposed between the packing ring and gland, and having a diameter substantially equal to the opening of the casing.

At 20 is indicated a follower or annular member, preferably being of L-shape in cross section. Its lateral flange 21 provides a mounting for one terminal of the coiled spring 22, its transverse body 23 having a bearing upon one of the ends of the two-part packing ring, and provided with apertures 24.

At 25 is indicated a bearing-ring, the aperture 26 thereof being greater in diameter than the diameter of the piston rod to allow an intake of steam, and provided with a peripheral groove 27 for a mounting thereon of the opposite terminal of the spiral spring.

As thus described, the annular follower 20, by operation of the spring is pressed against the packing ring, and the packing ring is pressed against the chafing ring, and this ring is pressed against the body of the gland. Aperture 27 of the packing box is of ample diameter to provide for an intake of steam, and steam under pressure causes the segments of the metallic packing to make contact with the piston, steam exerting a pressure at this time within the oppositely-disposed recesses 18 of the segments, after passing through apertures 24 of the follower.

On account of the central apertures 28, 29 and 30, respectively, of the gland, chafing-ring and follower being greater in diameter than the diameter of the piston rod, said rod may have a swinging movement, as required, during its reciprocation.

While steam under pressure may freely pass within the packing box, apertures 24 of the follower and recesses 18 of the segments, to press the segments upon the surface of the piston rod, to prevent escape of steam through the gland, it will be seen that, if steam is not under pressure the segments will bear loosely or lightly upon the surface of said piston rod, and this is a desirable feature, for when moving down grades or inclines steam is usually cut off, and friction is hardly appreciable of these parts at this time, and the wear is lessened.

With respect to the parts mentioned it will be seen that the two-part packing ring sustains substantially all of the friction and wear, and this may be readily replaced whenever desired.

In order to make a change of the metallic packing, or to adjust any of the parts within the packing box, the gland may be conveniently removed from its mounting upon the cylinder head, and the parts are then accessible for making such changes as may be required.

By the construction as described, the packing box provides a support within the cylinder for the bearing ring upon which one end of the spring is mounted, and gland 8 provides a removably mounted closure plate for aperture 8 of the cylinder head and a support for the rings and other parts of the packing.

Since the transverse walls are parallel of the chafing-ring, packing ring, follower-plate and gland, which are in contact, steam cannot escape therebetween.

Bearing-ring 27 provides a mounting so that the spring will have a uniform tension, and the pressure of the several parts are sustained by the gland or closure-plate.

Having fully described my invention, what I claim and desire to secure by Letters Patent is,—

1. A metallic packing for piston rods, comprising, in combination with an apertured cylinder head provided on one of its sides with a packing box, its opposite side having a closure plate removably mounted thereon, said packing box and closure plate being traversed by the piston rod; a packing ring divided between its central opening and periphery and mounted upon the piston rod; a chafing ring disposed between the packing ring and closure plate; an annular follower-plate mounted upon the piston rod, said follower-plate being L-shaped in cross-section, the inner portion thereof forming a ledge extending substantially parallel with and adjacent to said piston rod, the outer portion of said follower-plate being apertured and adapted to bear upon said packing ring; and a coiled spring having a support for one of its ends upon the wall of the packing box, its opposite end being mounted upon the ledge of said follower.

2. A metallic packing for piston rods of cylinders, comprising a closure plate secured upon the outer side of the cylinder head and circumscribing the piston rod, a two-part packing ring divided transversely between its opening and its periphery and mounted upon the piston rod inwardly of the closure plate, said packing ring being formed with oppositely-disposed, longitudinal channels; a follower mounted upon the piston rod inwardly of the packing ring and formed as a collar having an integral, apertured, upright, annular plate and a lateral plate; a coiled spring having one of its ends suitably supported, its opposite end being mounted upon the lateral plate of said follower and adapted to exert a pressure upon the upright plate thereof in a direction of said closure plate.

3. A metallic packing, comprising an annular casing, a centrally apertured closure-plate mounted upon one of the ends of the casing; an annular follower-plate disposed within and having a less diameter than the opening of the casing and provided with an annular ledge; a two-part packing ring divided transversely between its aperture and its periphery, disposed between the follower-plate and closure plate and having a less diameter than the opening of the casing; a compression member mounted upon the ledge of the follower-plate and adapted to exert a pressure in a direction of the closure-plate.

4. A metallic packing for piston rods, comprising an annular casing, a closure-plate mounted upon the end of said casing and having an annular aperture greater in diameter than the diameter of the piston rod, said aperture being traversed by said piston rod; a chafing ring disposed within the sleeve parallel with the closure plate, said chafing ring being mounted upon and having a greater diameter for its opening than the diameter of the piston rod; a two-part packing ring mounted upon the piston, said packing ring being disposed parallel with the chafing ring within and having a less diameter than the diameter of the interior diameter of the casing; a follower-member within the casing and mounted upon the piston rod, said follower-member being formed as a collar L-shaped in cross section, the upright portion thereof being apertured and disposed parallel with the packing ring; and a coiled spring having a suitable support for one of its ends, its opposite end being mounted upon the lateral portion of the follower-member, said spring adapted to exert a pressure upon the upright portion of the follower-member in a direction of said closure-plate.

In testimony whereof I have affixed my signature in presence of two witnesses.

JAMES BOWIE.

Witnesses:
HIRAM A. STURGES,
A. F. CLARK.

---

Copies of this patent may be obtained for five cents each, by addressing the "Commissioner of Patents, Washington, D. C."